United States Patent
Vadaparty et al.

(10) Patent No.: US 10,630,811 B1
(45) Date of Patent: Apr. 21, 2020

(54) MAINFRAME SERVICE REQUEST ORCHESTRATOR AND MULTIPLEXER

(71) Applicant: Morgan Stanley Services Group Inc., New York, NY (US)

(72) Inventors: Kumar Vadaparty, Belle Mead, NJ (US); Vishal Agrawal, Montville, NJ (US); Alex Suprun, East Brunswick, NJ (US); Arun Maroli, Edison, NJ (US); Vilas Mhatre, Long Branch, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/688,307

(22) Filed: Nov. 19, 2019

Related U.S. Application Data

(63) Continuation of application No. 16/379,172, filed on Apr. 9, 2019.

(51) Int. Cl.
*H04L 29/06* (2006.01)
*G06Q 40/04* (2012.01)
*H04L 29/08* (2006.01)

(52) U.S. Cl.
CPC ............. *H04L 67/40* (2013.01); *G06Q 40/04* (2013.01); *H04L 67/02* (2013.01); *H04L 67/28* (2013.01)

(58) Field of Classification Search
CPC ......... H04L 67/40; H04L 67/42; H04L 67/02; H04L 67/28; H04L 67/2833
See application file for complete search history.

(56) References Cited

U.S. PATENT DOCUMENTS

| | | |
|---|---|---|
| 2004/0091144 A1 | 5/2004 | Call et al. |
| 2005/0021594 A1* | 1/2005 | Bernardin ............... G06F 9/505 709/200 |
| 2008/0046817 A1 | 2/2008 | Sharp et al. |
| 2008/0177872 A1* | 7/2008 | Vengroff ................. H04L 67/02 709/223 |
| 2014/0310322 A1 | 10/2014 | Ruan et al. |
| 2018/0089601 A1 | 3/2018 | Link |
| 2019/0066214 A1 | 2/2019 | Teixeira et al. |

* cited by examiner

*Primary Examiner* — Chirag R Patel
(74) *Attorney, Agent, or Firm* — K&L Gates LLP

(57) ABSTRACT

Efficient, reusable, extensible light weight framework orchestrates discrete mainframe service calls as a single composite service call. The single composite call requires a single mainframe socket and the mainframe disaggregates the composite service call upon receipt to process the individual service calls therein, thereby allowing the mainframe to handle more services calls simultaneously. A similar framework orchestrates distributed service calls from a mainframe client.

20 Claims, 6 Drawing Sheets

MAINFRAME SERVICE REQUEST ORCHESTRATOR AND MULTIPLEXER

PRIORITY CLAIM

The present application is a continuation application under 35 U.S.C. § 120 of U.S. application Ser. No. 16/379,172, filed Apr. 9, 2019, which is incorporated herein by reference.

BACKGROUND

An order management system is a computer system that executes financial security trade orders in an efficient and cost-effective manner. Typically, order management systems utilize a mainframe computer to handle calls from distributed servers. In a typical mainframe computing environments, distributed clients make calls to the mainframe. Each call requires its own socket connection with the mainframe, but there are only a limited number of socket connections available with the mainframe, usually a couple hundred (e.g., 350 available socket connections). Thus, the mainframe can handle only a limited number of calls simultaneously. Further, in an order management context, a number of separate mainframe calls for data (e.g., five calls) are often needed to validate a trade order. In periods of high trading activity, where the number of trade orders and their corresponding mainframe data calls outnumber the number of available socket connections, the ability of the mainframe to respond quickly to the calls is reduced.

SUMMARY

In one general aspect, the present invention is directed to an efficient, reusable, extensible light weight framework for orchestrating discrete mainframe service calls as a single composite service call. The single composite call requires a single mainframe socket and the mainframe disaggregates the composite service call upon receipt to process the individual service calls therein, thereby allowing the mainframe to handle more services calls simultaneously. Preferably the framework supports multiple transport protocols such as REST, MQ Queues, and SOAP, for example. A similar framework orchestrates distributed service calls from a mainframe client. These and other benefits of the present invention will be apparent from the description that follows.

FIGURES

Various embodiments of the present invention are described herein by way of example in connection with the following figures, wherein.

DESCRIPTION

Figure 1A:
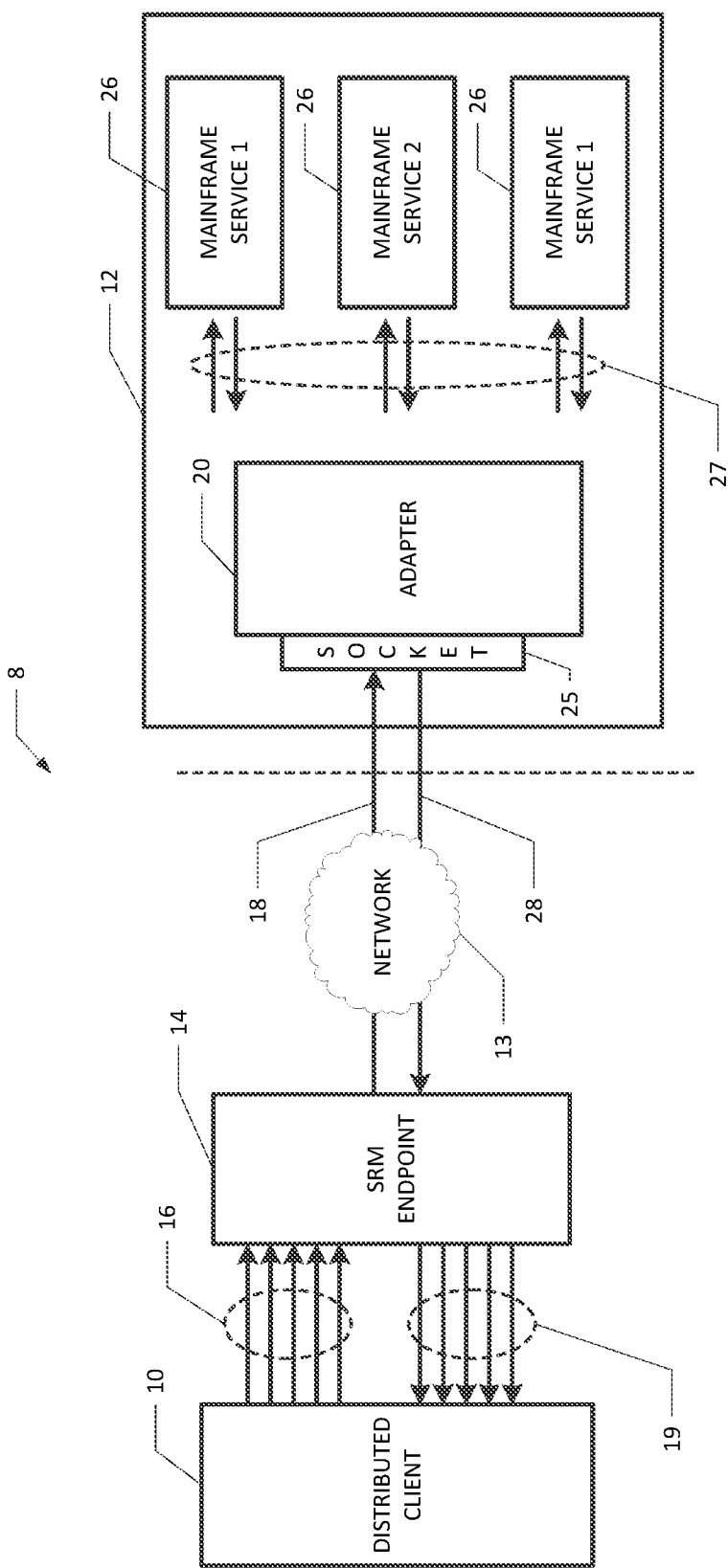
FIGS. 1A, 1B and 2 are diagrams of a computer system according to various embodiments of the present invention, where the computer system comprises a mainframe computer system for responding to mainframe service calls from distributed clients.

FIG. 1 illustrates a computer system 8 according to various embodiments of the present invention. In the illustrated computer system 8, a distributed client 10 makes service calls via a data network 13 to a mainframe computer system 12. In one embodiment, the computer system 8 is for processing orders to trade financial products, such as trades of stocks, bonds, options or other derivatives, foreign exchange, etc. In such an embodiment, when the distributed client 10 receives a trade order, it may need to make several services calls to the mainframe computer system 12, such as to check whether the order is appropriate size, the status of the trader's account, whether the trade satisfies any applicable risk checks, etc. Typically, a distributed client in an order management system needs to make about five calls to the mainframe to validate a trade order. Preferably these calls are made and processed concurrently so as to speed up the processing of the order. If distributed client 10 receives multiple trade orders and/or there are additional distributed clients making service calls to the mainframe computer system 12 (such as shown in FIG. 2), the mainframe computer system 12 will receive numerous concurrent services calls.

Traditionally, each service call must be made to a discrete network socket of the mainframe, but there are a limited number of network sockets available from the mainframe. Usually this number is around 350 or so. If each trade order requires five concurrent services calls, the mainframe can only handle about seventy trade orders at a time. In periods of high trade activity, this may not been sufficient to meet expected service level requirements. If the number of calls exceeds the number of sockets, all of the calls cannot be made concurrently, in which case some trade orders may need to be delayed until a socket is made available.

To remedy this drawback, embodiments of the present invention utilize a service request manager (SRM) at the distributed client side. The SRM endpoint 14 may be implemented as a network node, e.g., a host computer or server, that is programmed to receive multiple concurrent calls 16 from the distributed client 10 and aggregate them into a single composite call 18 that is transmitted to the mainframe computer system 12. Importantly, the single composite call 18 preferably requires only one network socket 25 of the mainframe computer system 12. That is, for example, the mainframe 12 can first establish ("bind") an address that the SRM endpoint 14 can use to send messages to the mainframe computer system 12. When the address is established, the mainframe computer system 12 waits for clients, e.g., the SRM endpoint 14, to request a service. The aggregator endpoint-to-mainframe exchange takes place when the SRM endpoint 14 connects to the mainframe 12 through the socket 25. The mainframe 12 performs the requested mainframe services in the composite call 18 and sends back the replies to the distributed client 10 in a composite call response communication 28 before the socket session is closed. That way, if a composite call 18 can aggregate up to five separate service calls 16 from the distributed client 10, the capacity of the mainframe computer system 12 is increased five times.

The SRM endpoint 14 can be addressed by the distributed client 10 by a network address, such as an IP address. As such, the SRM endpoint network node 14 may comprise a processor and memory, where the memory stores instructions (e.g., software) that when executed by the processor causes the processor of the SRM endpoint 14 to bulk and transmit the mainframe service calls from the distributed client 10 to the mainframe computer system. The memory that stores the software may be primary and/or secondary computer memory (e.g., RAM or ROM as primary memory, and a HDD as secondary computer memory). More details for various embodiments of the SRM endpoint are described below in connection with FIG. 1B.

To process such composite calls 18, the mainframe computer system 12 preferably comprises an adapter 20. More details for various embodiments of the adapter 20 are also described below in connection with FIG. 1B. In general, the adapter 20 disaggregates or splits the composite service call 18 from the SRM endpoint 14 into its individual local mainframe service calls 27, which are sent to the appropriate mainframe services 26 for handling the service calls. Only three mainframe services 26 are shown in FIG. 1 for the sake of simplicity; an actual mainframe computer system, particularly in an order management system, may have many additional mainframe services. The adapter 20 then bundles the responses from the mainframe services 26 together and sends them in a single, composite call response communication 28 back to the SRM endpoint 14, using the single socket session from the mainframe socket 25 before the socket is closed. The SRM endpoint 14 then splits up the composite call response communication 28 into individual call responses 19 that are sent back to the distributed client 10.

As shown in FIG. 1B, the SRM endpoint 14 may comprise an aggregator 30, a cache 32, a splitter 34, and an error mapper/filter 36. The aggregator 30 aggregates the incoming calls 16 from the distributed client 10 into the composite service call 18 that is sent via the socket 25 to the mainframe computer system 12. The individual calls 16 may be ordered one after another in the composite service call 18, and each individual call 16 in the composite service call 18 has identifying information (e.g., a header) that signifies the start of each call in the composite service call 18.

In various embodiments, before including a call 16 from the distributed client 10 in the composite service call 18, the aggregator 30 may query the cache 32 to determine whether the same call was recently made to the mainframe computer system 12. That is, for example, some or all of the calls 16, and their respective responses from the mainframe computer system 12, may be stored temporarily in the cache 32 and each associated with a timer. If a subsequent call 16 from the distributed client 10 requests the same information as prior call in the cache 32, and the response is available in the cache 32 and the timer has not timed out, the aggregator 30 does not include that call in the composite service call 18 to the mainframe computer system 12. Rather, the SRM endpoint 12 uses the response from that prior call stored in the cache 32 to send back to the distributed client 10, thereby avoiding the need to send the call to the mainframe computer system 12. That way, the SRM endpoint 14 is smartly programmed to not send repetitive calls 16 to the mainframe computer system 12. For example, if the distributed client 10 sends six calls 16 to the SRM endpoint 14, and the cache 32 has non-timed-out responses for two of the six calls, the aggregator 30 may then aggregate only the four calls 16 where the cache 32 does not have a non-timed-out response in the composite service call 18 sent to the mainframe computer system 12.

Also as shown in FIG. 1B, the adapter 20 may comprise a splitter 40, a service catalog 42, a sync/async adapter 44, and an aggregator. When the adapter 20 receives a composite service call 18 from SRM endpoint 14, the splitter 40 splits the composite call into its separate calls based the identifying information for each call 16 in the composite service call 18. Then, in various embodiments, the splitter 40 queries the service catalog 42 to determine which mainframe services 26 to invoke for each call 16. The service catalog 42 also indicates whether the mainframe services 26 should be invoke synchronously (e.g., sequentially) or asynchronous (not sequentially). The splitter 40 then invokes the appropriate mainframe services 26 via the sync/async adapter 44. The sync/async adapter 44 sends the individual local mainframe service calls 27 to the mainframe services 26 either synchronously (sequentially) or asynchronously (in any order, including at the same time) as indicated by the service catalog 42 for type of calls 16 in the composite service call 18. For example, for synchronous calls, one local mainframe service call 27 may depend on the response from a prior local mainframe service call 27. Therefore, the sync/async adapter 44 may send the first local mainframe service call 27; wait for the response; send the second local mainframe service call 27; and so on. For asynchronous calls, the sync/async adapter 44 transmits the local mainframe service calls 27 the mainframe services 26 in any sequence, which may include sending some or all of the local mainframe service calls 27 at the same time (e.g., in parallel). In either case (synchronous or asynchronous), the sync/async adapter 44 collects the responses from the mainframe services 26. The aggregator 46 then aggregates the responses into the composite call response communication 28 that is sent back to the SRM endpoint 14 (via the network 13 and still using the single socket 25). Similar to the aggregator 30 of the SRM endpoint 13, the aggregator 46 of the SRM adapter 46 may assemble the response 28 by placing the individual local mainframes responses 27 back-to-back in data packets, and identifying information (e.g., headers) for the individual local mainframes responses 27 may indicate where the individual local mainframes responses 27 in the composite response 28 begin and end.

If an incoming call is not in the service catalog 42, it can be considered an invalid call. In that case, the adapter 20 (e.g., the aggregator 46) can include an error response message for that incoming call in the composite response message 28 sent to the SRM endpoint 14.

Invoking the mainframe services 26 in parallel saves time, but the adapter 20 (e.g., the sync/async adapter 44) needs to wait for all of the responses from the mainframe services 26 before assembling the response for the distributed client 10. In various embodiments, the adapter 20 (e.g., the sync/async adapter 44) may invoke a timer for the calls 27 to the mainframe services 26. If a mainframe service 26 takes too long to respond (i.e., the timer for the response by the mainframe service 26 for the call 27 times out), the adapter 20 (e.g., the sync/async adapter 44) can terminate the delayed call 27 and the response to the distributed client 10 for the terminated call can be that the mainframe service 26 timed out or something to that effect. The timeout settings for the local mainframe calls may be stored in the service catalog 42 and retrieved for each call when the splitter 40 queries the service catalog. Terminating the delayed calls while still continuing the non-delayed call responses allows some of the data to be returned to the distributed client 10, as opposed to no data at all. Rejecting/terminating calls in this manner also helps reduce load on the mainframe services 26 by rejecting requests if too much time is spent in a waiting queue.

For the response 28 from the mainframe computer system 12 to the SRM endpoint 14, the error mapper/filter 36 may detect whether there are any errors in the response 28 from the mainframe computer system 12, e.g., a response to a call is missing, etc. An example of an error may be where the call is not in the service catalog 42, as described above. If there are no error messages, the splitter 34 of the SRM endpoint 14 splits the composite response 28 into the individual responses (e.g., using the header information for the individual responses in the composite response 28) and sends the individual responses 19 to the distributed client 10. For any errors detected by the error mapper/filter 36, the response 19 to the distributed client 10 may be an error message.

In various embodiments, each communication sent via a mainframe socket (e.g., communications 18 and 28 in FIGS. 1A and 1B) requires a separate Secure Sockets Layer/Transport Layer Security (SSL/TLS) handshake. The handshake establishes between the parties (e.g., the distributed client 10 and the mainframe computer system 12) detail about how the communication will proceeds, such as a cipher suite, verification, and that a secure connection is in place before the actual transfer of data. By aggregating several calls 16 on the front-end at the SRM endpoint 14, as well as their respective responses from the mainframe services 26 by the mainframe adapter 20, the computer system 8 of the present invention can reduce the number of SSL/TSL handshakes. For example, if five calls 16 are aggregated into one communication 18, and five responses from the mainframe services 26 are reaggregated by the adapter 20 to send back to the distributed client 10, using the same socket session, the number of SSL/TLS handshakes is reduced from five to one (assuming each of the five calls and responses without the disaggregator and reaggregator would have required a single socket each), a fivefold decrease.

The service calls 16 may, for example, comprise SOAP requests. Also, the messages 18 and 28 may be SOAP, REST, or MQ messages, for example. SOAP (Simple Object Access Protocol) messages use Hypertext Transfer Protocol (HTTP) and XML (Extensible Markup Language) to allow processes running on disparate operating systems (such as Windows for the distributed clients 10 and Linux for the mainframe computer system 12) to communicate using XML. Since Web protocols like HTTP are installed and running on all operating systems, SOAP allows clients (e.g., the distributed clients 10) to invoke web services (e.g., the mainframe services 26) and receive responses independent of language and platforms.

Representational State Transfer (REST) is an architectural style that defines a set of constraints to be used for creating web services. Web Services that conform to the REST architectural style, or RESTful web services, provide interoperability between computer systems on an IP network. REST-compliant web services allow the requesting systems to access and manipulate textual representations of web resources by using a uniform and predefined set of stateless operations. In a RESTful web service, requests made to a resource's URI will elicit a response with a payload formatted in HTML, XML, JSON, or some other format. The response can confirm that some alteration has been made to the stored resource, and the response can provide hypertext links to other related resources or collections of resources. When HTTP is used, as is most common, the operations available are GET, POST, PUT, DELETE, and other predefined CRUD HTTP methods. By using a stateless protocol and standard operations, REST systems aim for fast performance, reliability, and the ability to grow, by re-using components that can be managed and updated without affecting the system as a whole, even while it is running.

MQ is a family of network message-oriented middleware products from IBM. MQ allows independent and potentially non-concurrent applications on a distributed system to securely communicate with each other. The core components of MQ are: (i) messages, i.e., a collection of binary or character (for instance ASCII or EBCDIC) data that have some meaning to a participating program; as in other communications protocols, storage, routing, and delivery information is added to the message before transmission and stripped from the message prior to delivery to the receiving application; (ii) Message queues, which are objects that store messages in an application; and (iii) a Queue Manager, which is a system service that provides a logical container for the message queue. The queue manager is responsible for transferring data to other queue managers via message channels. Queue managers handle storage, timing issues, triggering, and all other functions not directly related to the actual movement of data.

Figure 1B:
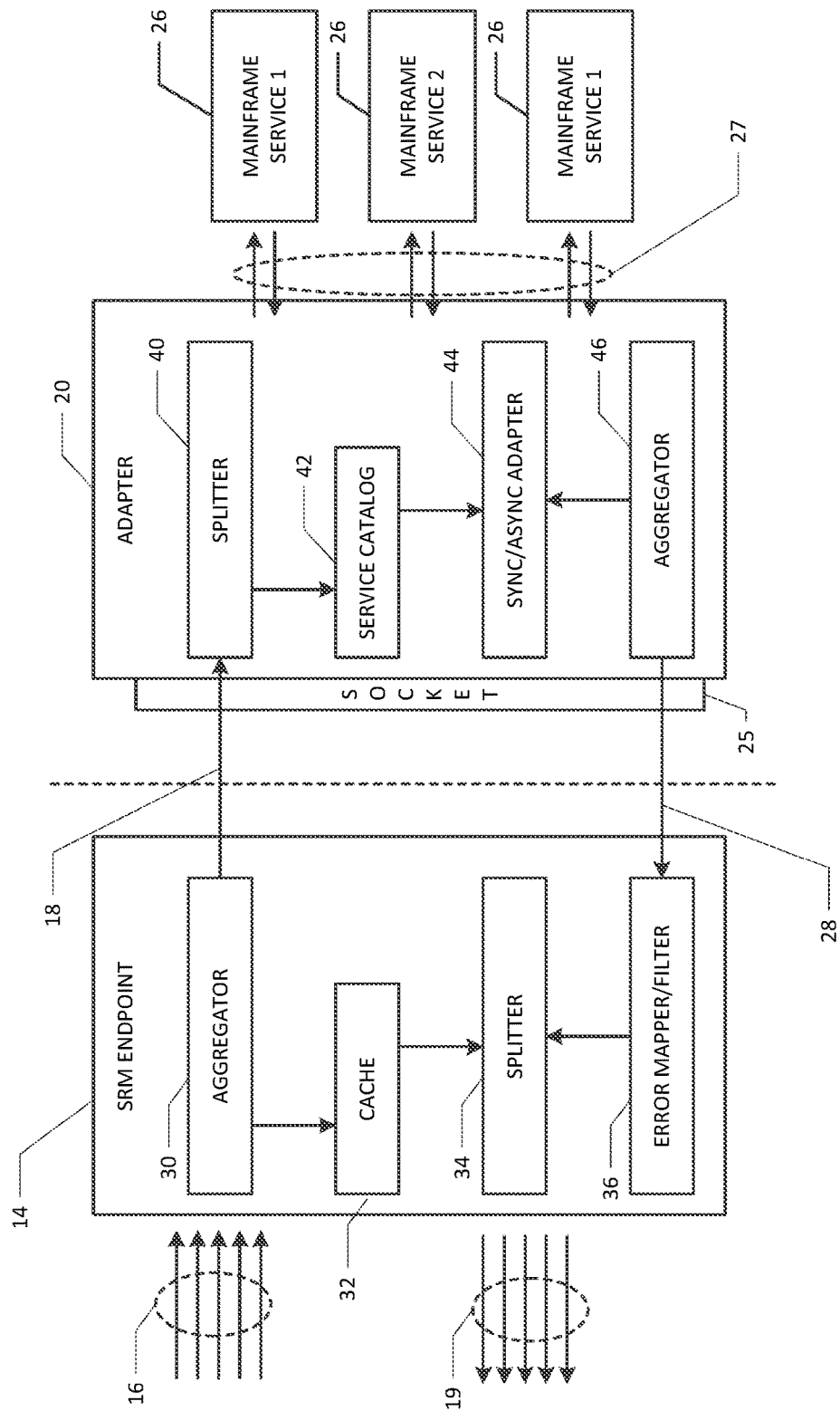
Figure 2:
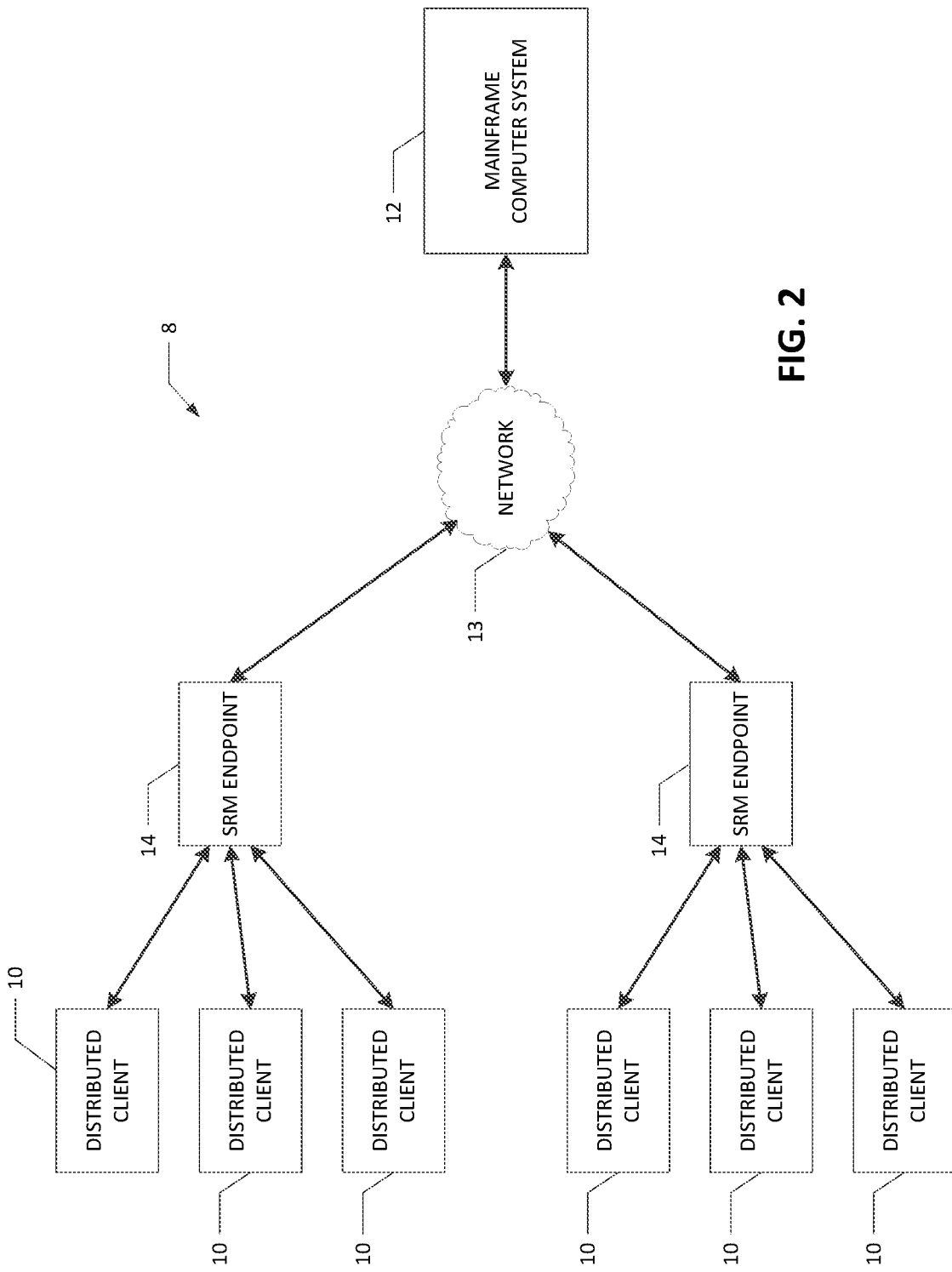

In FIG. 1A, only one distributed client 10 is shown. In practice, the mainframe computer system 12 may field service calls from multiple distributed clients that transmit service calls to the mainframe computer system 12, as shown in FIG. 2. Such other distributed clients 10 may be associated with a SRM endpoint 14, as shown in FIG. 2. As described above, the SRM endpoints 14 may bulk the service calls from an associated distributed client 14 and, using a single mainframe computer system socket 25, send the bulked service calls to the mainframe computer system 12. There could be one SRM endpoint 14 for each distributed client or one SRM endpoint 14 could aggregate the calls from multiple distributed clients 10. The distributed clients 10 may be in communication with an SRM endpoint 14 via a suitable data network (not shown), such as a LAN, WAN, Ethernet, etc.

The network 13 may be any suitable data network for handling HTTP and or MQ messages, such as a LAN, WAN, etc. Each distributed client 10 may be implemented with any suitable type of computer device, such as a server, PC or laptop, which is configured to transmit and receives messages to and from the mainframe computer system 12 via the data network 13. In the context of an order management system, the distributed clients 10 may place trade orders for financial products and, as a consequence, are required to make numerous service calls to the mainframe computer system to, for example, validate the trade orders, such as to perform any required pre-order trade checks. The mainframe computer system 12 may comprise one or a number of mainframe computers that provide the mainframe services 26.

Figure 3:
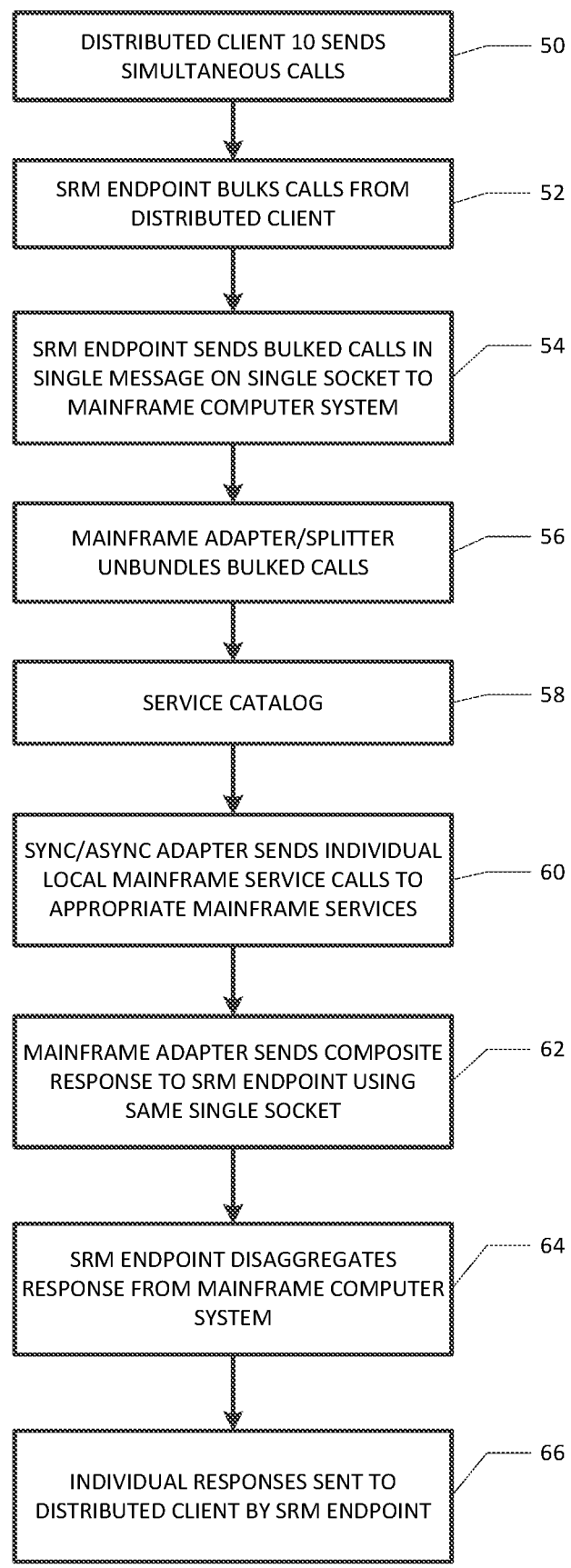
FIG. 3 is a flow chart of a process performed by the computer system of FIGS. 1A, 1B and 2 according to various embodiments of the present invention.

FIG. 3 is a flow chart of a process flow performed by the computer system 8 according to various embodiments of the present invention. At step 50, a distributed client 10 issues more than one, a typically around five, simultaneous mainframe service calls 16 to the mainframe computer system 12. In the context of an order management system, the mainframe service calls may be required to validate a trade order for a financial product (e.g., a stock trade). At step 52, the SRM endpoint 14 at the distributed client 10 bulks the calls 16 into a single, composite service call 18, as described above. This step may comprise, as described above, the aggregator 30 of the SRM endpoint 14 checking the cache 32 to determine if recent, similar calls had been made. At step 54, the SRM endpoint (e.g., the aggregator 30) sends the single, composite service call 18 to the mainframe computer system 12, using a single socket 25 of the mainframe computer system 12. The communication 18 may adhere to the SOAP, REST, or MQ message formats, for example. At step 56, the splitter 40 of the adapter 20 at the mainframe computer system 12 unbundles the bulked communication 18 received from the distributed client and, at step 58, consults to the service catalog 42 to see which and how the mainframe services 26 should be invoked for each call 16 in the composite service call 18. Based on the information from the service catalog 26, at step 60, the sync/async adapter 44 sends the local mainframe service calls 27 to the appropriate mainframe service 26. Then, at step 62, the adapter 20 (e.g., the aggregator 46) bulks the responses from the mainframe services 26 and at step 62 sends the bulked responses in a single, call response message 28 back to the SRM client 14, again using the same session from the single socket 25 of the mainframe. And then, at step 64, the SRM endpoint 14 disaggregates the response 28 from the mainframe computer system 12, with the individual responses 19 being transmitted to the distributed client 10 by the SRM endpoint 14 at step 66.

An embodiment of the present invention was tested in an order management system and it showed dramatic improvement over the state-of-the-art systems. Under the test conditions, the embodiment of the present invention reduced the number of mainframe service calls by about a factor of about 6 or 7, and decreased the response time by about a factor of 2. The decrease in response time owes, among other things, to the fact that more sockets were available with embodiments of the present invention, so that (i) the distributed clients did not have to wait as long for a socket to become available and (ii) there were a reduced number of SSL/TLS handshakes In various embodiments, the adapter 20 may also throttle mainframe services 26 to present service overload. For example, the service catalog 42 may specify a predefined limit on the number of active mainframe services. If the limit is exceeded, when the splitter 40 queries the service catalog 42 for a new composite service call 18, the service catalog 42 will indicate that the number of active mainframe services exceeds the limit, and the adapter 20 rejects the call. As such, an error message is sent back by the adapter 40 (e.g., the aggregator 46) in the composite response message 28.

Figure 4:
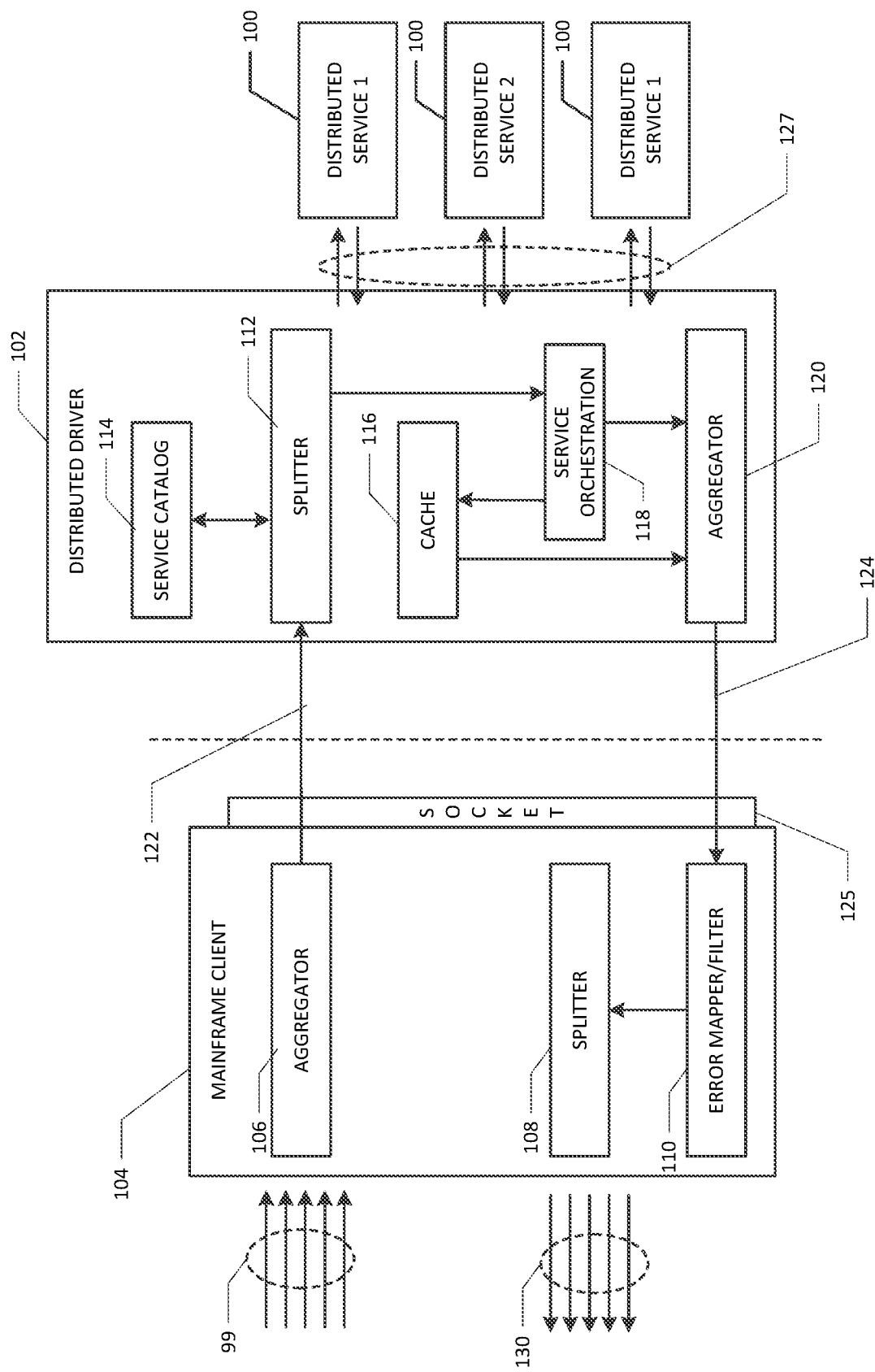
FIG. 4 is a diagram of a computer system according to various embodiments of the present invention, where distributed services respond to calls from a mainframe client.
Figure 5:
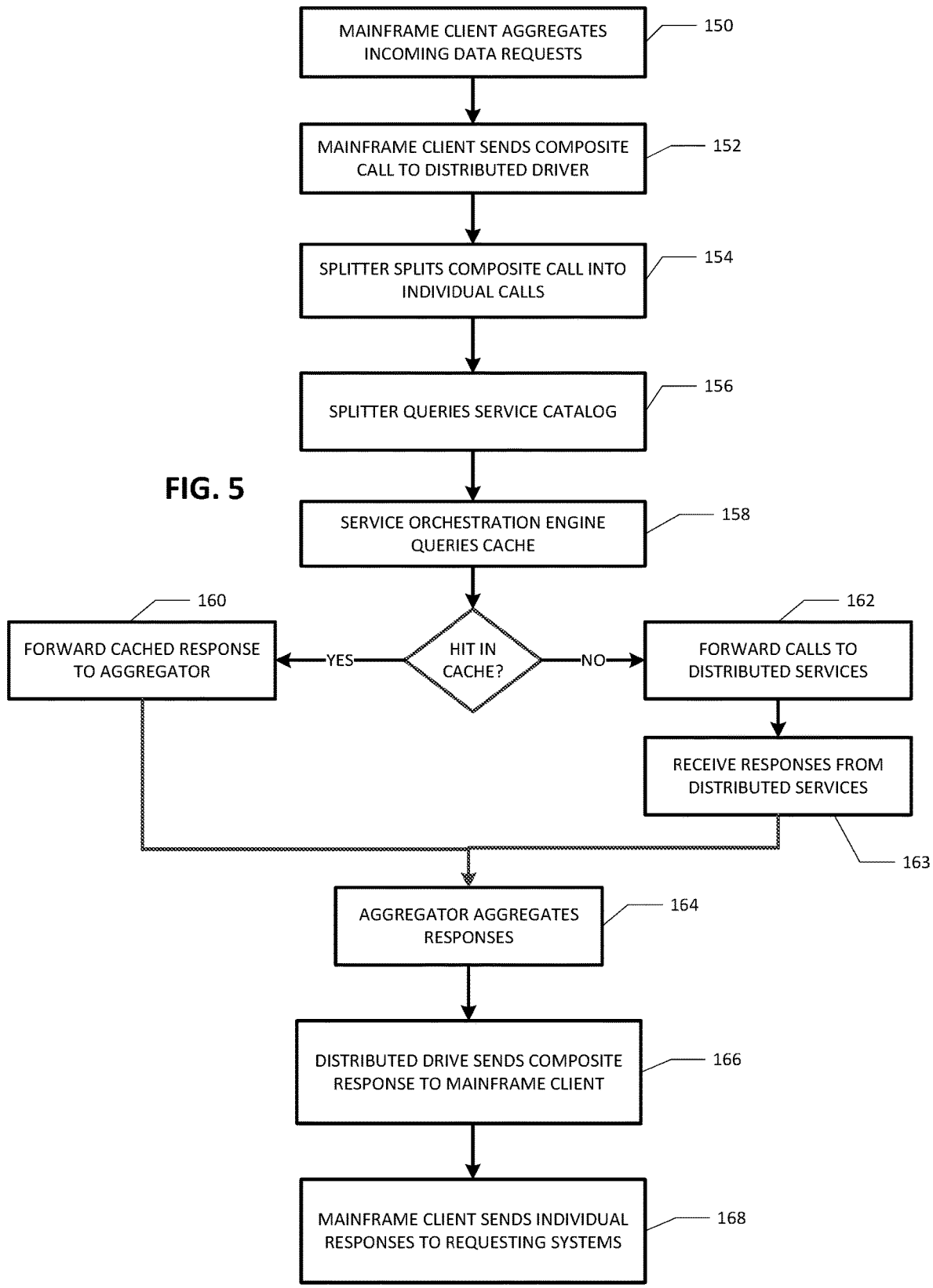
FIG. 5 is a flow chart of a process performed by the computer system of FIG. 4 according to various embodiments of the present invention.

A similar but reverse arrangement to FIG. 1B could be used for calls from a mainframe client to a distributed service, as shown in the example of FIGS. 4 and 5. FIG. 4 shows a computer system that comprises a mainframe client 104 that sends data requests to distributed services 100 and FIG. 5 is a flow chart showing a process performed by the computer system of FIG. 5 according to various embodiments of the present invention. Referring to both of this figures, according to the illustrated embodiment, at step 150, an aggregator 106 of the mainframe client 104 aggregates the incoming data requests 99 into a composite call 122 that is sent, at step 152, via a single mainframe socket 125, and a data network (not shown) to a distributed driver network node 102. As in other embodiments described herein, the aggregator 106 of the mainframe client 104 may aggregate the data requests 99 by bundling them one after another (serially) in the composite call 122.

At step 154, a splitter 112 of the distributed driver 102 splits the composite call 122 into its individual calls, similar to how the splitter 40 of the adapter 20 in FIG. 1B split the incoming call message 18. Once the splitter 40 splits the calls, at step 156, the splitter 40 queries the service catalog 114 to determine the appropriate distributed service 100 for each call and the applicable timeout settings, if any, for the distributed client calls. A service orchestration engine 118 of the distributed driver 102 orchestrates the calls 127 to the distributed services 100. In various embodiments, upon receiving the calls from the splitter 112, the service orchestration engine 118 at step 158 may first query a cache 116 to determine if there was a recent, identical distributed service call. If there was, at step 160, the response to that recent, identical distributed service call is forwarded to the aggregator 120 for bundling into the composite response 124 that is sent back to the mainframe client 104. Where there is not hit in the cache 116 for a call from the splitter 112, at step 162, the service orchestration engine 118 forwards the call to the appropriate distributed service 100. The service orchestration engine 118 may transmit the calls synchronously or asynchronously to the distributed services 100, similar to how the sync/async adapter 44 of the adapter 20 in FIG. 1B transmitted the local mainframe calls 27 to the mainframe services 26. The service orchestration engine 118 may also terminate calls 127 where the response from the distributed service 100 exceeds the timeout setting for the call (e.g., as set in the service catalog 114), similarly to the sync/async adapter 44 of the adapter 20 in FIG. 1B terminated calls 27 from the mainframe services 26 when a mainframe service exceeds the applicable timeout setting. At step 163, the distributed driver 102 receives the responses from the distributed services 100 to the calls that were sent at step 162. Then, at step 164, the aggregator 120 aggregate the responses, whether from the cache 116 or the distributed services 100, into the composite response 124 that is, at step 166, sent back to the mainframe client 104, still using the single socket session. Then, at step 168, the error mapper/filter 110 of the mainframe client 104 may detect and/or filter out error messages in the response 124, so that a splitter 108 may split up the individual responses 130 in the composite response 124 so be sent back to the requesting entity/system.

The software for the various compute systems described herein and other computer functions described herein may be implemented in computer software using any suitable computer programming language. Programming languages for computer software and other computer-implemented instructions may be translated into machine language by a compiler or an assembler before execution and/or may be translated directly at run time by an interpreter. The SRM endpoint 14 and the mainframe adapter 20 in FIG. 1B, and the mainframe client 104 and distributed driver 114 in FIG. 4, may each be implemented with appropriate computer systems, such as one or more networked servers or any other suitable computer system. These computer components may have one or more processors that execute software instructions stored in computer memory (e.g., RAM and/or ROM) of the computer components. In particular, in various embodiments, the code for the SRM endpoint 14 and distributed drive 102 may be written primarily in Java, and the code for adapter 20 and mainframe client 104 may be written primarily in COBOL, although other programming languages could be used.

In various general aspects, therefore, the present invention is directed to a computer system that comprises a mainframe computer system, an endpoint network node, and a distributed client. The mainframe computer system provides mainframe services in response to mainframe service calls thereto, and has a plurality of sockets for receiving mainframe service calls and sending responses thereto. The endpoint network node is in communication with the mainframe computer system via a data network. The distributed client sends mainframe service calls to the mainframe computer system via the endpoint network node. The endpoint network node is configured to bulk a plurality of individual mainframe service calls from the distributed client into a single, composite mainframe service call message for transmission to the mainframe computer system via the data network, and transmit the single, composite mainframe service call message to the mainframe computer system using a single socket session of the mainframe computer system. The mainframe computer system comprises a computer-implemented adapter that is configured to: (i) disaggregate the plurality of individual mainframe service calls in the single, composite mainframe service call message from the aggregator endpoint network node upon receipt of the single, composite mainframe service call message so that the plurality of individual mainframe service calls are responded to by the mainframe services of the mainframe computer system; and (ii) aggregate, into a single, composite mainframe service call response message, corresponding responses from the mainframe services of the mainframe computer system to the plurality of individual mainframe service calls in the single, composite mainframe service call message and transmit the single, composite mainframe service call response message to the distributed client via the data network using the same single socket session of the mainframe computer system before the single socket session closes.

In another general aspect, the present invention is directed to a computer implemented method that comprises the steps of transmitting, by a distributed client, a plurality of mainframe service calls to an endpoint network node and bulking, by the endpoint network node, the plurality of mainframe service calls into a single, composite mainframe service call message. The method further comprises the step of transmitting, by the endpoint network node, the single, composite mainframe service call message to a mainframe computer system that provides mainframe services in response to mainframe service calls thereto. The mainframe computer system has a plurality of sockets for receiving mainframe service calls and sending responses thereto, and the single, composite mainframe service call message is transmitted to the mainframe computer system using a single socket session of the mainframe computer system. The method further comprises the steps of: unbulking, by the mainframe computer system, the plurality of mainframe service calls in the single, composite mainframe service call message from the endpoint network node upon receipt of the single, composite mainframe service call message; determining, by the mainframe services of the mainframe computer system, responses to the plurality of mainframe service calls in the single, composite mainframe service call message; bulking, by the mainframe computer system, the responses from the mainframe services of the mainframe computer system to the plurality of mainframe service calls into a single, composite mainframe service call response message; and transmitting, by the mainframe computer system, the single, composite mainframe service call response message to the distributed client via the data network using the same single socket session of the mainframe computer system before the socket single socket session is closed.

According to various implementations of the systems and methods, the mainframe computer system is part of an order management system for managing trade orders for financial products and the plurality of mainframe service calls from the distributed client comprises mainframe data service calls to the mainframe services to validate a trade order. Also, the transmission of the single, composite mainframe service call message to the mainframe computer system and the transmission of the single, composite mainframe service call response message from the mainframe computer system to the distributed client may require a single SSL handshake between the distributed client and mainframe computer system. In addition, the single, composite mainframe service call message from the distributed client may comprise a SOAP message using HTTP or a MQ queue message.

According to yet other implementations, the endpoint network node comprises a cache that stores mainframe service calls and corresponding responses, and the endpoint network node is configured to query the cache upon receiving mainframe service calls from the distributed client. Also, the endpoint network node may be configured to provide a response to the distributed client to a received mainframe service call from the distributed client when the response to the mainframe service call is stored in the cache without sending the mainframe service call to the mainframe computer system.

According to still further implementations, the adapter is configured to query a service catalog in response to the adapter receiving a composite mainframe service call message from the endpoint network node. In such circumstances, the service catalog indicates which mainframe services should be called for the individual mainframe service calls in the composite mainframe service call message. Additionally, the adapter may be configured to terminate a mainframe service call to a mainframe service when a response from the mainframe service to the mainframe service call exceeds a timeout setting for the mainframe service call.

According to yet another general aspect, a computer system according to the present invention may comprise: (i) a mainframe client computer system that receives a plurality of individual distributed service calls for distributed services, where the mainframe client computer system has a plurality of sockets for transmitting and receiving messages; (ii) a plurality of distributed service provider computer systems that provide the distributed services in response to distributed service calls thereto; and (iii) a distributed driver network node that is in communication with the distributed service provider computer systems and the mainframe client computer system. The mainframe client computer system is configured to bulk a plurality of received individual distributed service calls into a single, composite distributed service call message for transmission to the distributed driver computer system, and transmit the single, composite mainframe service call message to the distributed driver computer system using a single socket session of the mainframe client computer system. The distributed drive network node is configured to: (i) disaggregate the plurality of individual distributed service calls in the single, composite distributed service call message from the mainframe client computer system upon receipt of the single, composite distributed service call message so that the plurality of individual distributed service calls are responded to by the plurality of distributed service provider computer systems; and (ii) aggregate, into a single, composite distributed service call response message, corresponding responses from the plurality of distributed service provider computer systems to the plurality of individual distributed service calls in the single, composite distributed service call message and transmit the single, composite distributed service call response message to the mainframe client computer system using the same single socket session of the mainframe computer system before the single socket session closes.

According to various implementations, the transmission of the single, composite distributed service call message to the distributed driver network node and the transmission of the single, composite distribution service call response message from the distributed driver network node to the mainframe client computer system may require a single SSL handshake between the distributed driver network node and mainframe client computer system.

Also, the distributed driver network node may comprise a cache that stores distributed service calls and corresponding responses. In that case, the distributed driver network node is configured to query the cache upon receiving the single, composite distributed service call message from the mainframe client computer system. Still further, the distributed driver network node may be configured to provide a response to the mainframe client computer system to an individual mainframe service call in the single, composite distributed service call message received from the mainframe client computer system when the response to the individual distributed client service call is stored in the cache without sending the individual distributed service call to the plurality of distributed service provider computer systems.

According to yet other implementations, the distributed driver network node is configured to query a service catalog in response to the distributed driver network node receiving a composite distributed service call message from the mainframe client computer system, where the service catalog indicates which distributed services should be called for the individual distributed service calls in the composite distributed service call message. Also, the distributed driver network node may be configured to terminate a distributed service call to one of the plurality of distributed service provider computer systems when a response from the distributed service provider computer system to the distributed service call exceeds a timeout setting for the mainframe service call.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, although embodiments above were described in the context of mainframe data calls for an order management system, the present invention is not so limited unless otherwise indicated, and can therefore be applied to other types of mainframe systems where bulked calls are used to reduce mainframe socket consumption.

Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer system comprising:
a mainframe computer system that provides mainframe services in response to mainframe service calls thereto, wherein the mainframe computer system has a plurality of sockets for receiving mainframe service calls and sending responses thereto;
an endpoint network node that is in communication with the mainframe computer system via a data network; and
a distributed client that sends mainframe service calls to the mainframe computer system via the endpoint network node, wherein:
the endpoint network node is configured to bulk a plurality of individual mainframe service calls from the distributed client into a single, composite mainframe service call message for transmission to the mainframe computer system via the data network, and transmit the single, composite mainframe service call message to the mainframe computer system using a single socket session of the mainframe computer system; and
the mainframe computer system comprises a computer-implemented adapter that is configured to:
disaggregate the plurality of individual mainframe service calls in the single, composite mainframe service call message from the aggregator endpoint network node upon receipt of the single, composite mainframe service call message so that the plurality of individual mainframe service calls are responded to by the mainframe services of the mainframe computer system; and
aggregate, into a single, composite mainframe service call response message, corresponding responses from the mainframe services of the mainframe computer system to the plurality of individual mainframe service calls in the single, composite mainframe service call message and transmit the single, composite mainframe service call response message to the distributed client via the data network using the same single socket session of the mainframe computer system before the single socket session closes.

2. The system of claim 1, wherein:
the mainframe computer system is part of an order management system for managing trade orders for financial products; and
the plurality of mainframe service calls from the distributed client comprises mainframe data service calls to the mainframe services to validate a trade order.

3. The computer system of claim 1, wherein the transmission of the single, composite mainframe service call message to the mainframe computer system and the transmission of the single, composite mainframe service call response message from the mainframe computer system to the distributed client requires a single SSL handshake between the distributed client and mainframe computer system.

4. The computer system of claim 3, wherein the single, composite mainframe service call message from the distributed client comprises a SOAP message using HTTP.

5. The computer system of claim 3, wherein the single, composite mainframe service call message from the distributed client comprises a MQ queue message.

6. The computer system of claim 1, wherein:
the endpoint network node comprises a cache that stores mainframe service calls and corresponding responses, and
the endpoint network node is configured to query the cache upon receiving mainframe service calls from the distributed client.

7. The computer system of claim 6, wherein the endpoint network node is configured to provide a response to the distributed client to a received mainframe service call from the distributed client when the response to the mainframe service call is stored in the cache without sending the mainframe service call to the mainframe computer system.

8. The computer system of claim 1, wherein the adapter is configured to query a service catalog in response to the adapter receiving a composite mainframe service call message from the endpoint network node, wherein the service catalog indicates which mainframe services should be called for the individual mainframe service calls in the composite mainframe service call message.

9. The computer system of claim 8, wherein the adapter is configured to terminate a mainframe service call to a mainframe service when a response from the mainframe service to the mainframe service call exceeds a timeout setting for the mainframe service call.

10. A computer implemented method comprising:
transmitting, by a distributed client, a plurality of mainframe service calls to an endpoint network node;
bulking, by the endpoint network node, the plurality of mainframe service calls into a single, composite mainframe service call message;
transmitting, by the endpoint network node, the single, composite mainframe service call message to a mainframe computer system that provides mainframe services in response to mainframe service calls thereto, wherein the mainframe computer system has a plurality of sockets for receiving mainframe service calls and sending responses thereto, wherein the single, composite mainframe service call message is transmitted to the mainframe computer system using a single socket session of the mainframe computer system;
unbulking, by the mainframe computer system, the plurality of mainframe service calls in the single, composite mainframe service call message from the endpoint network node upon receipt of the single, composite mainframe service call message;
determining, by the mainframe services of the mainframe computer system, responses to the plurality of mainframe service calls in the single, composite mainframe service call message;
bulking, by the mainframe computer system, the responses from the mainframe services of the mainframe computer system to the plurality of mainframe service calls into a single, composite mainframe service call response message; and
transmitting, by the mainframe computer system, the single, composite mainframe service call response message to the distributed client via the data network using the same single socket session of the mainframe computer system before the socket single socket session is closed.

11. The computer-implemented method of claim 10, wherein:
the endpoint network node comprises a cache that stores mainframe service calls and corresponding responses; and
the method further comprises querying, by the endpoint network node, the cache upon receiving mainframe service calls from the distributed client.

12. The computer-implemented method of claim 11, further comprising providing a response, by the endpoint network node to the distributed client, to a received mainframe service call from the distributed client when the response to the mainframe service call is stored in the cache without sending the mainframe service call to the mainframe computer system.

13. The computer-implemented method of claim 10, further comprising querying, by the adapter, a service catalog in response to the adapter receiving a composite mainframe service call message from the endpoint network node, wherein the service catalog indicates which mainframe services should be called for the individual mainframe service calls in the composite mainframe service call message.

14. The computer-implemented method of claim 13, further comprising terminating, by the adapter, a mainframe service call to a mainframe service when a response from the mainframe service to the mainframe service call exceeds a timeout setting for the mainframe service call.

15. A computer system comprising:
a mainframe client computer system that receives a plurality of individual distributed service calls for distributed services, wherein the mainframe client computer system has a plurality of sockets for transmitting and receiving messages;
a plurality of distributed service provider computer systems that provide the distributed services in response to distributed service calls thereto;
a distributed driver network node that is in communication with the distributed service provider computer systems and the mainframe client computer system, wherein:
the mainframe client computer system is configured to bulk a plurality of received individual distributed service calls into a single, composite distributed service call message for transmission to the distributed driver computer system, and transmit the single, composite mainframe service call message to the distributed driver computer system using a single socket session of the mainframe client computer system; and
the distributed drive network node is configured to:
disaggregate the plurality of individual distributed service calls in the single, composite distributed service call message from the mainframe client computer system upon receipt of the single, composite distributed service call message so that the plurality of individual distributed service calls are responded to by the plurality of distributed service provider computer systems; and
aggregate, into a single, composite distributed service call response message, corresponding responses from the plurality of distributed service provider computer systems to the plurality of individual distributed service calls in the single, composite distributed service call message and transmit the single, composite distributed service call response message to the mainframe client computer system using the same single socket session of the mainframe computer system before the single socket session closes.

16. The computer system of claim 15, wherein the transmission of the single, composite distributed service call message to the distributed driver network node and the transmission of the single, composite distribution service call response message from the distributed driver network node to the mainframe client computer system requires a single SSL handshake between the distributed driver network node and mainframe client computer system.

17. The computer system of claim 15, wherein:
the distributed driver network node comprises a cache that stores distributed service calls and corresponding responses; and the distributed driver network node is configured to query the cache upon receiving the single, composite distributed service call message from the mainframe client computer system.

18. The computer system of claim 15, wherein the distributed driver network node is configured to provide a response to the mainframe client computer system to an individual mainframe service call in the single, composite distributed service call message received from the mainframe client computer system when the response to the individual distributed client service call is stored in the cache without sending the individual distributed service call to the plurality of distributed service provider computer systems.

19. The computer system of claim 15, wherein the distributed driver network node is configured to query a service catalog in response to the distributed driver network node receiving a composite distributed service call message from the mainframe client computer system, wherein the service catalog indicates which distributed services should be called for the individual distributed service calls in the composite distributed service call message.

20. The computer system of claim 19, wherein the distributed driver network node is configured to terminate a distributed service call to one of the plurality of distributed service provider computer systems when a response from the distributed service provider computer system to the distributed service call exceeds a timeout setting for the mainframe service call.

* * * * *